_(12)_ United States Patent
Bueb et al.

(10) Patent No.: US 10,942,846 B2
(45) Date of Patent: Mar. 9, 2021

(54) AGGREGATED AND VIRTUALIZED SOLID STATE DRIVES ACCESSED VIA MULTIPLE LOGICAL ADDRESS SPACES

(71) Applicant: Micron Technology, Inc., Boise, ID (US)

(72) Inventors: Christopher Joseph Bueb, Folsom, CA (US); Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 54 days.

(21) Appl. No.: 16/452,369

(22) Filed: Jun. 25, 2019

(65) Prior Publication Data

US 2020/0409832 A1 Dec. 31, 2020

(51) Int. Cl.
| | |
|---|---|
| *G06F 12/00* | (2006.01) |
| *G06F 12/02* | (2006.01) |
| *G06F 3/06* | (2006.01) |
| *G06F 13/38* | (2006.01) |
| *G06F 12/10* | (2016.01) |
| *G06F 13/40* | (2006.01) |

(52) U.S. Cl.
CPC ........ *G06F 12/0238* (2013.01); *G06F 3/0604* (2013.01); *G06F 3/0617* (2013.01); *G06F 3/0655* (2013.01); *G06F 3/0661* (2013.01); *G06F 3/0668* (2013.01); *G06F 3/0683* (2013.01); *G06F 3/0688* (2013.01); *G06F 12/0223* (2013.01); *G06F 12/0284* (2013.01); *G06F 12/0292* (2013.01); *G06F 12/10* (2013.01); *G06F 13/382* (2013.01); *G06F 13/404* (2013.01)

(58) Field of Classification Search
CPC .. G06F 12/0238; G06F 3/0604; G06F 3/0617; G06F 3/0655; G06F 3/0661; G06F 3/0668; G06F 3/0683; G06F 12/0223; G06F 12/0284; G06F 12/0292; G06F 12/10; G06F 13/382; G06F 13/404
See application file for complete search history.

(56) References Cited

U.S. PATENT DOCUMENTS

| | | | |
|---|---|---|---|
| 6,654,941 | B1 | 11/2003 | Baumbach |
| RE43,346 | E * | 5/2012 | Miloushev .......... H04L 67/2838 709/213 |
| 8,935,493 | B1 | 1/2015 | Dolan et al. |
| 10,437,476 | B2 * | 10/2019 | Frolikov ................ G06F 3/0608 |
| 2005/0280140 | A1 | 12/2005 | Corbin, Jr. et al. |
| 2006/0059308 | A1 * | 3/2006 | Uratani ................... G06F 3/067 711/114 |
| 2009/0188704 | A1 | 7/2009 | Lee et al. |

(Continued)

*Primary Examiner* — John A Lane
(74) *Attorney, Agent, or Firm* — Greenberg Traurig

(57) ABSTRACT

A solid state drive having a drive aggregator and multiple component solid state drives. The drive aggregator associates the host interfaces with different logical address spaces, interprets commands received from the host interfaces in the different logical address spaces, and implements the commands using the plurality of component solid state drives. Some of the host interfaces can be configured to share a common logical address space. Some of the logical address spaces can be configured to have an overlapping region that are hosted on the same set of memory units such that the memory units can be addressed in any of the logical address spaces having the overlapping region.

8 Claims, 13 Drawing Sheets

(56) References Cited

U.S. PATENT DOCUMENTS

| | | |
|---|---|---|
| 2010/0082890 A1 | 4/2010 | Heo et al. |
| 2010/0259882 A1 | 10/2010 | Song |
| 2010/0259885 A1 | 10/2010 | Zheng et al. |
| 2011/0191649 A1 | 8/2011 | Lim et al. |
| 2012/0079180 A1 | 3/2012 | Ren |
| 2012/0233386 A1 | 9/2012 | Tong et al. |
| 2013/0332694 A1* | 12/2013 | Reissner ............... G06F 3/067 711/172 |
| 2015/0130059 A1 | 5/2015 | Ozawa et al. |
| 2015/0255130 A1 | 9/2015 | Lee et al. |
| 2016/0124847 A1 | 5/2016 | Malwankar et al. |
| 2017/0046295 A1 | 2/2017 | Schwemmer |
| 2017/0249256 A1 | 8/2017 | Kim et al. |
| 2019/0079895 A1 | 3/2019 | Kim et al. |
| 2019/0278498 A1 | 9/2019 | Dedrick |
| 2019/0294339 A1 | 9/2019 | Bolkhovitin et al. |
| 2020/0045110 A1* | 2/2020 | Varnica ............... G06F 3/0659 |
| 2020/0050470 A1* | 2/2020 | Guo ..................... G06F 3/0679 |

\* cited by examiner

AGGREGATED AND VIRTUALIZED SOLID STATE DRIVES ACCESSED VIA MULTIPLE LOGICAL ADDRESS SPACES

FIELD OF THE TECHNOLOGY

At least some embodiments disclosed herein relate to memory systems in general, and more particularly, but not limited to aggregation and virtualization of solid state drives that can be accessed using separate logical address spaces.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components.

Examples of memory components include memory integrated circuits. Some memory integrated circuits are volatile and require power to maintain stored data. Some memory integrated circuits are non-volatile and can retain stored data even when not powered. Examples of non-volatile memory include flash memory, Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM). In general, a host system can utilize a memory sub-system to store data at the memory components and to retrieve data from the memory components.

For example, a computer can include a host system and one or more memory sub-systems attached to the host system. The host system can have a central processing unit (CPU) in communication with the one or more memory sub-systems to store and/or retrieve data and instructions. Instructions for a computer can include operating systems, device drivers, and application programs. An operating system manages resources in the computer and provides common services for application programs, such as memory allocation and time sharing of the resources. A device driver operates or controls a specific type of devices in the computer; and the operating system uses the device driver to offer resources and/or services provided by the type of devices. A central processing unit (CPU) of a computer system can run an operating system and device drivers to provide the services and/or resources to application programs. The central processing unit (CPU) can run an application program that uses the services and/or resources. For example, an application program implementing a type of applications of computer systems can instruct the central processing unit (CPU) to store data in the memory components of a memory sub-system and retrieve data from the memory components.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to techniques to aggregate multiple memory sub-systems as a combined memory sub-system that functions as a single memory sub-system to a host system. In some embodiments, the single memory sub-system is configured with multiple host interfaces to service multiple host systems, or service a host system via multiple parallel and/or redundant connections.

Currently, a solid state drive (SSD) can be provided in a single integrated circuit package. For example, the solid state drive (SSD) can be packaged with a ball grid array (BGA) form factor. The BGA SSD has a controller embedded in the integrated circuit package to process commands from a host system, control operations to access data in media units or memory components embedded in the BGA SSD, and generate responses to the commands from the host system. However, the single integrated circuit package and/or the BGA form factor can limit the storage capacity of the BGA SSD.

At least some aspects of the present disclosure address the above and other deficiencies through a drive aggregator that is configured to aggregate and virtualize multiple SSDs as a single SSD for the host system. Thus, multiple BGA SSDs can be used to construct one high capacity SSD for the host system. The combined SSD can have a storage capacity that is not limited by the single integrated circuit package and/or the BGA form factor.

In general, the drive aggregator can be used to aggregate and virtualize multiple memory sub-systems for a host system. One example of a memory sub-system is a storage device that is connected to the central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. In some embodiments, the memory sub-system is a hybrid memory/storage sub-system that provides both memory functions and storage functions. In general, a host system can utilize a memory sub-system that includes one or more memory components. The host system can provide data to be stored at the memory sub-system and can request data to be retrieved from the memory sub-system.

Figure 1:
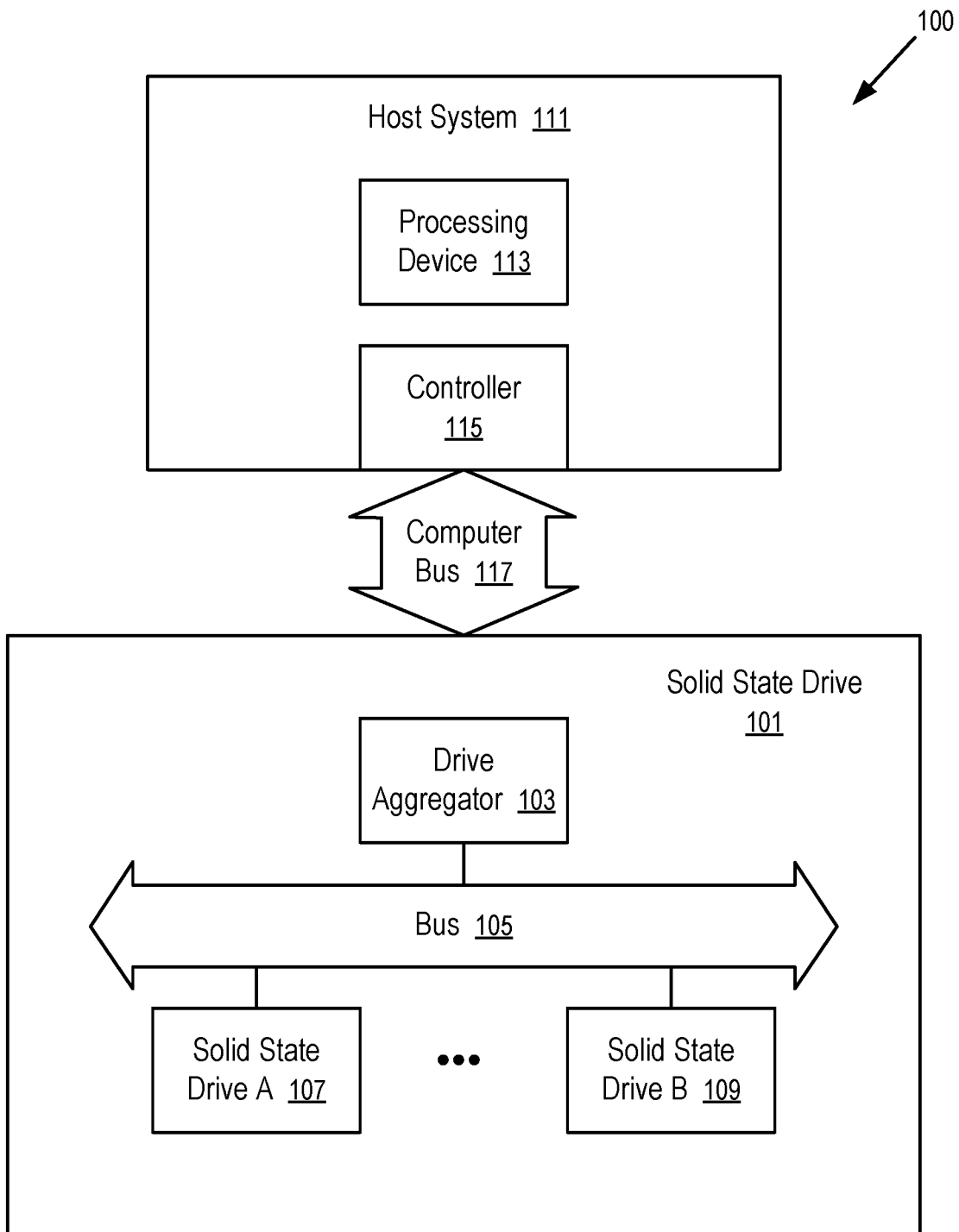
FIG. 1 illustrates an example computing system having a memory sub-system in accordance with some embodiments of the present disclosure.

FIG. 1 illustrates an example computing system 100 having a memory sub-system in accordance with some embodiments of the present disclosure. In FIG. 1, a solid state drive 101 is shown as an example of such a memory sub-system. The aggregated solid state drive 101 is constructed using multiple component solid state drives 107 to 109. A driver aggregator 103 of the solid state drive 101 virtualizes the entire combined capacity of the multiple component solid state drives 107 to 109 as the capacity of the aggregated solid state drive 101. The drive aggregator 103 shields the component solid state drives 107 to 109 from a host system 111 such that the host system 111 can access the memory capacity of the multiple component solid state drives 107 to 109 by addressing the single solid state drive 101. Each of the component solid state drives 107 to 109 in FIG. 1 is another example of a memory sub-system in general.

In general, a memory sub-system can include media, such as media units/memory components. The media units/memory components can be volatile memory components, non-volatile memory components, or a combination of such. Each of the media units/memory components can perform operations to store, record, program, write, or commit new data independent of the operations of other media units/memory components. Thus, the media units/memory components can be used in parallel in executing write commands. In some embodiments, the memory sub-system is a storage system. An example of a storage system is a solid state drive (SSD). In other embodiments, the memory sub-system is a memory module. Examples of a memory module includes a DIMM, NVDIMM, and NVDIMM-P. In further embodiments, the memory sub-system is a hybrid memory/storage sub-system. In general, the computing system 100 can include a host system 111 that uses a memory sub-system (e.g., the solid state drive 101) through a computer bus 117. For example, the host system 111 can write data to the memory sub-system and read data from the memory sub-system.

The host system 111 can be a computing device such as a desktop computer, laptop computer, network server, mobile device, or such computing device that includes a memory and a processing device. The host system 111 can include or be coupled to the memory sub-system, such as the solid state drive 101, via a computer bus 117, so that the host system 111 can read data from or write data to the memory sub-system. The host system 111 can be coupled to the memory sub-system via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 111 and the memory sub-system, such as the solid state drive 101. The host system 111 can further utilize an NVM Express (NVMe) interface to access the storage capacity of the memory sub-system when the memory sub-system is coupled with the host system 111 by the PCIe interface. The physical host interface can provide an interface for passing control, address, data, and other signals between the host system 111 and the memory sub-system, such as the solid state drive 101. FIG. 1 illustrates a solid state drive 101 as an example a memory sub-system. In general, the host system 111 can access multiple memory sub-systems via a same communication connection, multiple separate communication connections, and/or a combination of communication connections.

The host system 111 includes a processing device 113 and a controller 115. The processing device 113 of the host system 111 can be, for example, a microprocessor, a central processing unit (CPU), a processing core of a processor, an execution unit, etc. In some instances, the controller 115 can be referred to as a memory controller, a memory management unit, and/or an initiator. In one example, the controller 115 controls the communications over the computer bus 117 coupled between the host system 111 and the memory sub-system, such as the solid state drive 101.

In general, the controller 115 can send commands or requests to a memory sub-system for desired access to memory storage capacity. The controller 115 can further include interface circuitry to communicate with the memory sub-system via the computer bus 117. The interface circuitry can convert responses received from memory sub-system into information for the host system 111.

The controller 115 of the host system 111 can communicate with controller 115 of the memory sub-system to perform operations such as reading data, writing data, or erasing data at the memory components of the memory sub-system and other such operations. In some instances, the controller 115 is integrated within the same integrated circuit package of the processing device 113. In other instances, the controller 115 is separate from the integrated circuit package of the processing device 113. The controller 115 and/or the processing device 113 can include hardware such as one or more integrated circuits and/or discrete components, a buffer memory, a cache memory, or a combination thereof. The controller 115 and/or the processing device 113 can be a microcontroller, special purpose logic circuitry (e.g., a field programmable gate array (FPGA), an application specific integrated circuit (ASIC), etc.), or another suitable processor.

In general, media units/memory components of a memory sub-system (e.g., the solid state drive 107 or 109) can include any combination of the different types of non-volatile memory components and/or volatile memory components. An example of non-volatile memory components includes a negative-and (NAND) type flash memory. Each of the memory components can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and an MLC portion of memory cells. Each of the memory cells can store one or more bits of data (e.g., data blocks) used by the host system 111. Although non-volatile memory components such as NAND type flash memory are described, the memory components can be based on any other type of memory such as a volatile memory. In some embodiments, the memory components can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components can be grouped as memory pages or data blocks that can refer to a unit of the memory component used to store data.

In general, a memory sub-system (e.g., the solid state drive 107 or 109) can have a controller that communicates with the memory components of the memory sub-system to perform operations such as reading data, writing data, or erasing data and other such operations (e.g., in response to commands scheduled on a command bus). The controller of the memory sub-system can include hardware such as one or more integrated circuits and/or discrete components, a buffer memory, or a combination thereof. The controller of the memory sub-system can be a microcontroller, special purpose logic circuitry (e.g., a field programmable gate array (FPGA), an application specific integrated circuit (ASIC), etc.), or another suitable processor. The controller of the memory sub-system can include a processing device (e.g., processor) configured to execute instructions stored in local memory of the controller. For example, the local memory of the controller of the memory sub-system can include an embedded memory configured to store instructions for performing various processes, operations, logic flows, and routines that control operation of the memory sub-system, including handling communications between the memory sub-system and a host system (e.g., 111). In some embodiments, the local memory can include memory registers storing memory pointers, fetched data, etc. The local memory can also include read-only memory (ROM) for storing micro-code. While a typical memory sub-system has a controller, in another embodiment of the present disclosure, a memory sub-system may not include a controller, and can instead rely upon external control (e.g., provided by an external host, or by a processor or controller separate from the memory sub-system).

In general, the controller of a memory sub-system (e.g., the solid state drive 107 or 109) can receive commands or operations from the host system 111 and can convert the commands or operations into instructions or appropriate commands to achieve the desired access to the memory components of the memory sub-system. The controller of the memory sub-system (e.g., the solid state drive 107 or 109) can be responsible for other operations such as wear leveling operations, garbage collection operations, error detection and error-correcting code (ECC) operations, encryption operations, caching operations, and address translations between a logical block address and a physical block address. The controller of the memory sub-system (e.g., the solid state drive 107 or 109) can further include host interface circuitry to communicate with a host system (e.g., 111) via the physical host interface. The host interface circuitry can convert the commands received from the host system into command instructions to access the memory components as well as convert responses associated with the memory components into information for the host system (e.g., 111).

A memory sub-system (e.g., the solid state drive 107 or 109) can also include additional circuitry or components. In some embodiments, the memory sub-system (e.g., the solid state drive 107 or 109) can include a cache or buffer (e.g., DRAM) and address circuitry (e.g., a row decoder and a column decoder) that can receive an address from the controller of the memory sub-system and decode the address to access the memory components in the memory sub-system.

The computing system 100 includes a drive aggregator 103 that aggregates the capacities of the component solid state drives 107 to 109 and virtualize the entire combined capacity as the capacity of the single solid state drive 101. In some embodiments, the drive aggregator 103 includes logic circuitry to translate the commands/requests from the host system 111 into commands/requests to the solid state drives 107 to 109 and/or translate the responses from the solid state drives 107 to 109 into responses to the host system 111. The drive aggregator 103 accesses commands from the host system 111 according to a communication protocol for a solid state drive to accept commands from host systems. The drive aggregator 103 constructs and transmits commands to each of the component solid state drives (e.g., 107 or 109) according to a communication protocol for host systems to issue commands to solid state drives. The drive aggregator 103 accepts responses from each of the component solid state drives (e.g., 107 or 109) according to a communication protocol between host systems and solid state drives. The drive aggregator 103 constructs and transmits responses to the host system 111 according to communication protocol between host systems and solid state drives. The communication protocol used between the host system 111 and the driver aggregator 103 can be the same as the communication protocol used between the driver aggregator 103 and the component solid state drives 107 to 109 in one embodiment. The communication protocol used between the host system 111 and the driver aggregator 103 can be different from the communication protocol used between the driver aggregator 103 and the component solid state drives 107 to 109 in one embodiment. The drive aggregator 103 behaves like a controller of a standard solid state drive to the host system 111 according to one communication protocol and behaves like a standard host system to the component solid state drives 107 to 109 according to the same, or a different, communication protocol.

In the solid state drive 101, the driver aggregator 103 is connected to the component solid state drives 107 to 109 via a bus 105. For example, the bus 105 can include point to point serial connections from the driver aggregator 103 to the component solid state drives 107 to 109. The point to point serial connections between the driver aggregator 103 and the component solid state drives 107 to 109 can be in accordance with a serial advanced technology attachment (SATA) communication protocol, a peripheral component interconnect express (PCIe) communication protocol, or another protocol. The computer bus 117 between the host system 111 and the drive aggregator 103 can be in in accordance with a serial advanced technology attachment (SATA) communication protocol, a peripheral component interconnect express (PCIe) communication protocol, a universal serial bus (USB) communication protocol, a Fibre Channel communication protocol, a Serial Attached SCSI (SAS) communication protocol, a double data rate (DDR) memory bus communication protocol, etc.

The drive aggregator 103 can be implemented using an integrated circuit chip having a field programmable gate array (FPGA) or an application specific integrated circuit (ASIC). Alternatively, the drive aggregator 103 can be implemented at least in part via software or firmware. For example, the driver aggregator 103, or the processing device embedded within the driver aggregator 103, can be configured to execute instructions stored in memory for performing the operations of the drive aggregator 103 described herein. In some embodiments, the drive aggregator 103 is implemented in a single integrated circuit chip configured on the overall solid state drive 101 that has multiple component solid state drives 107.

Figure 2:
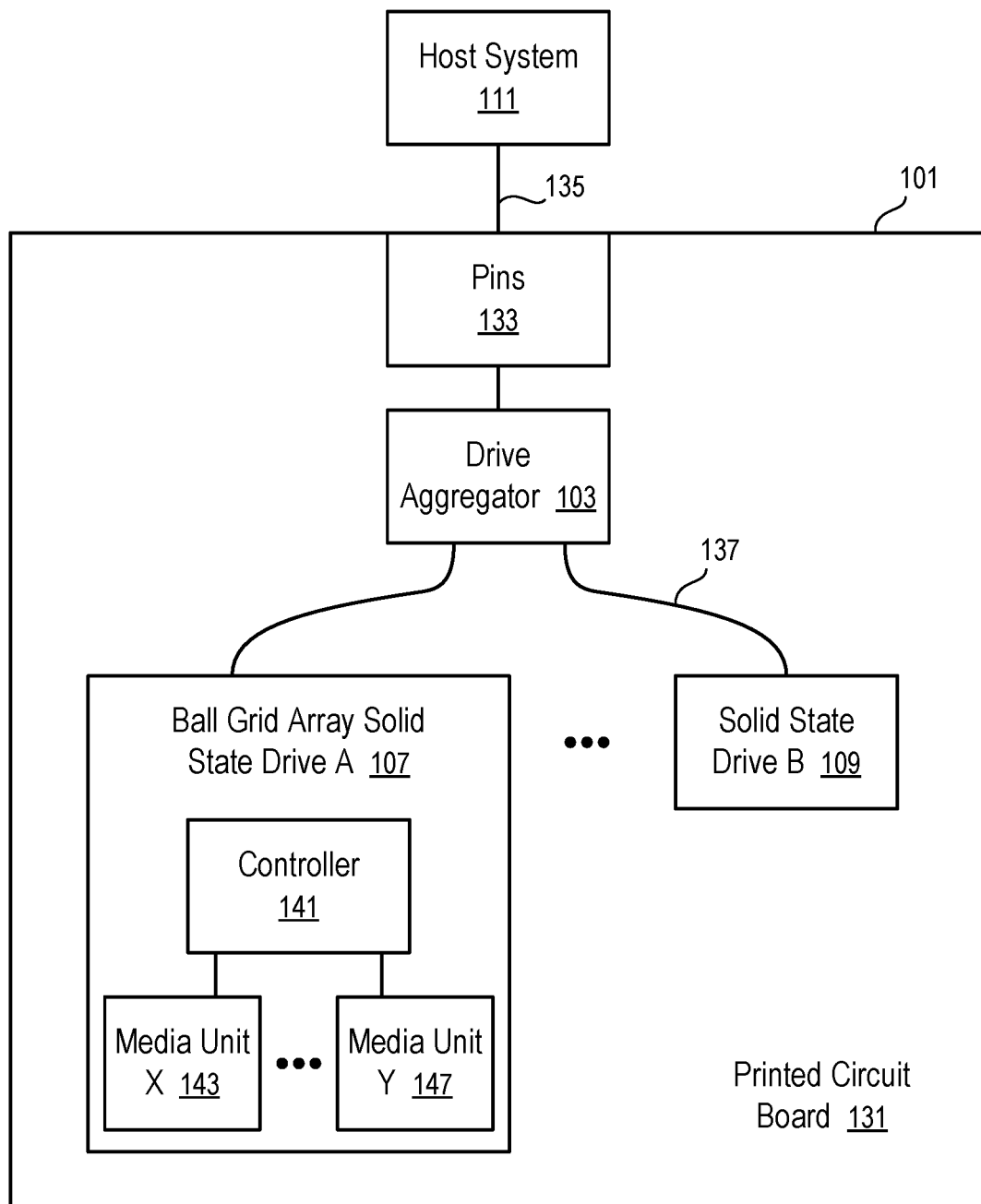
FIG. 2 shows a host system connected to a virtualized single solid state drive having multiple component solid state drives.

FIG. 2 shows a host system 111 connected to a virtualized single solid state drive having multiple component solid state drives 107 to 109. For example, the virtualized single solid state drive can be used to implement the solid state drive 101 illustrated in FIG. 1

In FIG. 2, a printed circuit board 131 is configured to have pins 133 for a connection 135 to the host system 111 as a single solid state drive 101. For example, the connection 135 can be a point to point serial connection in accordance with SATA, PCIe, USB, or another standard. Based on the communication standard, the host system 111 is configured to recognize the device configured on the printed circuit board 131 as a single solid state drive 101. The host system 111 addresses memory in the device based on the recognition of the device as a single solid state drive 101.

Commands from the host system 111 are received in the drive aggregator 103 via the connection 135 and the pins 133. The received commands are processed in the drive aggregator 103 for adjustment, mapping, and/or distribution to the component solid state drives 107 to 109. For example, each of the component solid state drives 107 to 109 can be implemented as a ball grid array (BGA) solid state drive (SSD) that is capable of processing the commands from the host system 111 directly. For example, when the connection 137 from the component solid state drive 109 to the drive aggregator 103 is reconnected directly to the host system 111, the host system 111 can recognize the solid state drive 109 and communicate directly the solid state drive 109 to store data in the solid state drive 109 and/or retrieve data from the solid state drive 109.

For example, a BGA SSD 107 can have a controller 141 that is capable of communicating with a host system (e.g., 111) directly to receive commands and provide responses; and the BGA SSD 107 can have multiple media units (memory components) 143 to 147 that have memory cells to store data.

The drive aggregator 103 is configured to shield the details of the component solid state drives 107 to 109 from the host system 111. Thus, the host system 111 does not have to address the component solid state drives 107 to 109 separately. For examples, according to a set of predetermined rules, the drive aggregator 103 can forward some commands from host system 111 to one component solid state drive (e.g., 107) and forward other commands from the host system 111 to another component solid state drive (e.g., 109).

For example, the drive aggregator 103 can divide the logical address space of the entire capacity of the device configured on the printed circuit board 131 into multiple regions. Each of the regions is associated with a corresponding one of the component solid state drives 107 to 109. When the drive aggregator 103 receives a command is received from the host system 111, the drive aggregator 103 determines the region in which the logical address of the command is located, identifies the target solid state drive (e.g., 107) that is associated with the determined region, adjusts the command to at least map the logical address in the command received in the host to the logical address in the target solid state drive (e.g., 107), and transmits the adjusted command to the target solid state drive (e.g., 107).

In some embodiments, the host system 111 is configured to organize the memory capacity of the virtualized single solid state drive 101 on the printed circuit board into named portions. A name portion of the memory capacity is a namespace. Logical addresses can be defined within different namespaces separate for the memory capacity of the virtualized single solid state drive 101. For example, a first namespace allocated on a first portion of the memory capacity of n blocks can have logical block addressing (LBA) addresses ranging from 0 to n−1; and a second namespace allocated on a second portion of the memory capacity of m block can have LBA addresses ranging from 0 to m−1. To access a memory block, the host system 111 identifies the namespace and the LBA address defined within the namespace.

The drive aggregator 103 can be configured to distribute operations requested by the host system 111 to the component solid state drives 107 to 109 based on namespaces. For example, the drive aggregator 103 can assign different namespaces created on the memory capacity of the virtualized single solid state drive 101 to different component solid state drives 107 to 109. Subsequently, the drive aggregator 103 can simply forward the commands from the host system 111 to the component solid state drives based on the namespaces specified in the commands.

Figure 3:
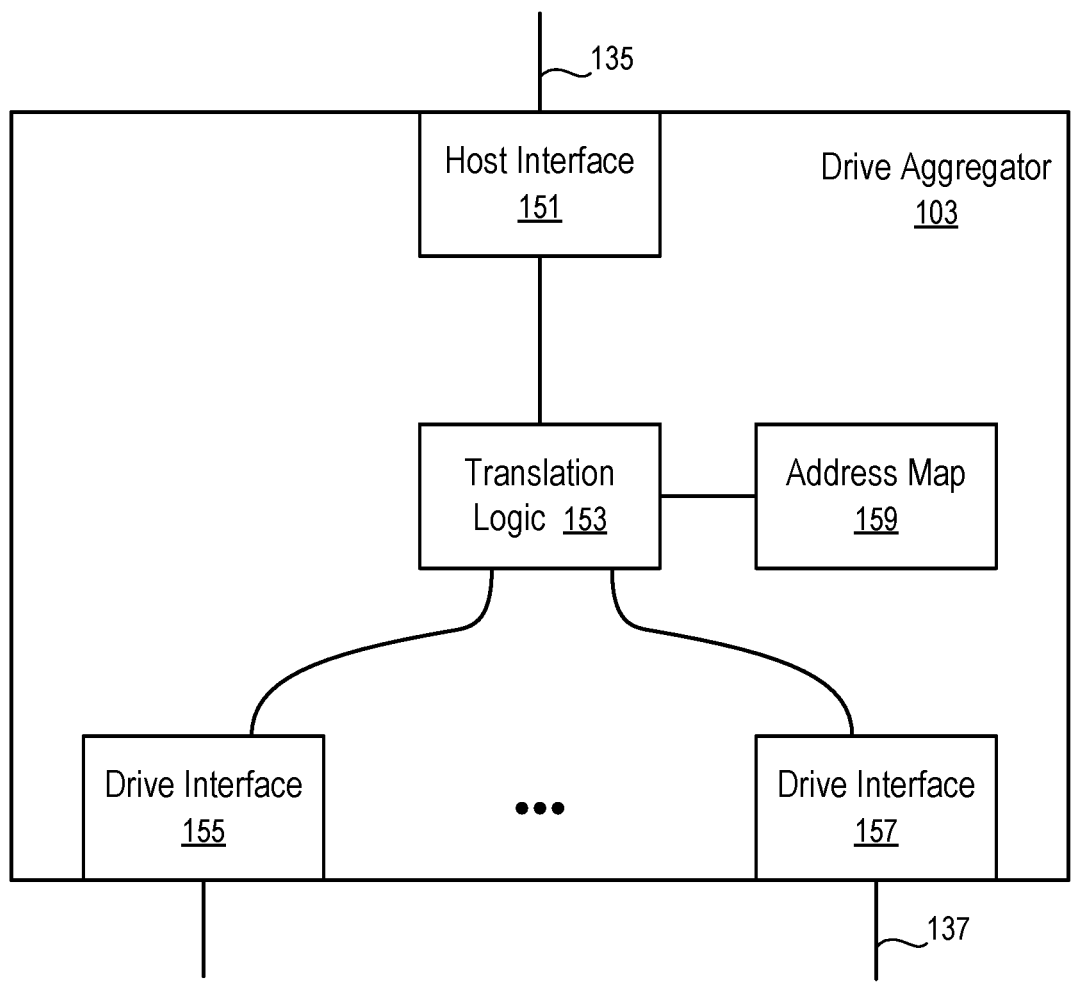
FIG. 3 shows a drive aggregator according to one embodiment.

FIG. 3 shows a drive aggregator 103 according to one embodiment. For example, the drive aggregator 103 of FIG. 3 can be used on the printed circuit board 131 of FIG. 2 and/or in the virtualized single solid state drive 101 of FIG. 1.

The drive aggregator 103 of FIG. 3 can be integrated within a single integrated circuit chip. The drive aggregator 103 of FIG. 3 includes a host interface 151 for a connection 135 to a host system (e.g., 111), a translation logic 153, and multiple drive interfaces 155 to 157. Each of the drive interfaces 155 to 157 can be used for a connection (e.g., 137) to a component solid state drive (e.g., 109).

The host interface 151 is configured to implement a solid state drive side of a communication protocol between host systems and solid state drives. Each of the drive interfaces 155 and 157 is configured to implement a host system side of a communication protocol between host systems and solid state drives. In some instances, the driver interfaces 155 to 157 can support different communication protocols (e.g., SATA and PCIe) such that the different types of component solid state drives 107 to 109 can be used.

The translation logic 153 is configured to receive a command from the host interface 151 and generate one or more commands for the drive interfaces 155 to 157. When one or more corresponding responses are received from the drive interfaces 155 to 157, the translation logic 153 generates a response to the command from the host interface 151.

The drive aggregator 103 has an address map 159 that controls the operation of the translation logic 153. For example, the address map 159 can be used to translate a logical address in the capacity of the virtualized single solid state drive 101 to the corresponding logical address in the capacity of a corresponding component solid state drive (e.g., 107 or 109) connected to one of the drive interfaces 155 to 157. Based on the address translation, the translation logic 153 can generate corresponding commands for the respective drive interfaces (e.g., 155 or 157).

In some implementations, the communication protocols used in the connection 135 and in the connection 137 are different. Thus, the translation logic 153 performs the command translations according to the differences in the communication protocols.

In some implementations, the communication protocols used in the connection 135 and in the connection 137 are different; and the translation logic 153 can simply forward a command received in the connection 135 to the drive interface 157. For example, when a namespace is created on the component solid state drive (e.g., 109) connected to drive interface 157, a command from the host interface 151 for read or write operations in the namespace can be forward to the drive interface 157.

The translation logic 153 can be implemented as a field programmable gate array (FPGA), an application specific integrated circuit (ASIC), or one or more microprocessors executing a set of instructions. The instructions and/or the address map 159 can be stored in a local memory unit of the drive aggregator 103. Alternatively, or in combination, the instructions and/or the address map 159 can be stored in one or more of the component solid state drives (e.g., 107 to 109) connected to the drive interfaces 155 to 157.

Figure 4:
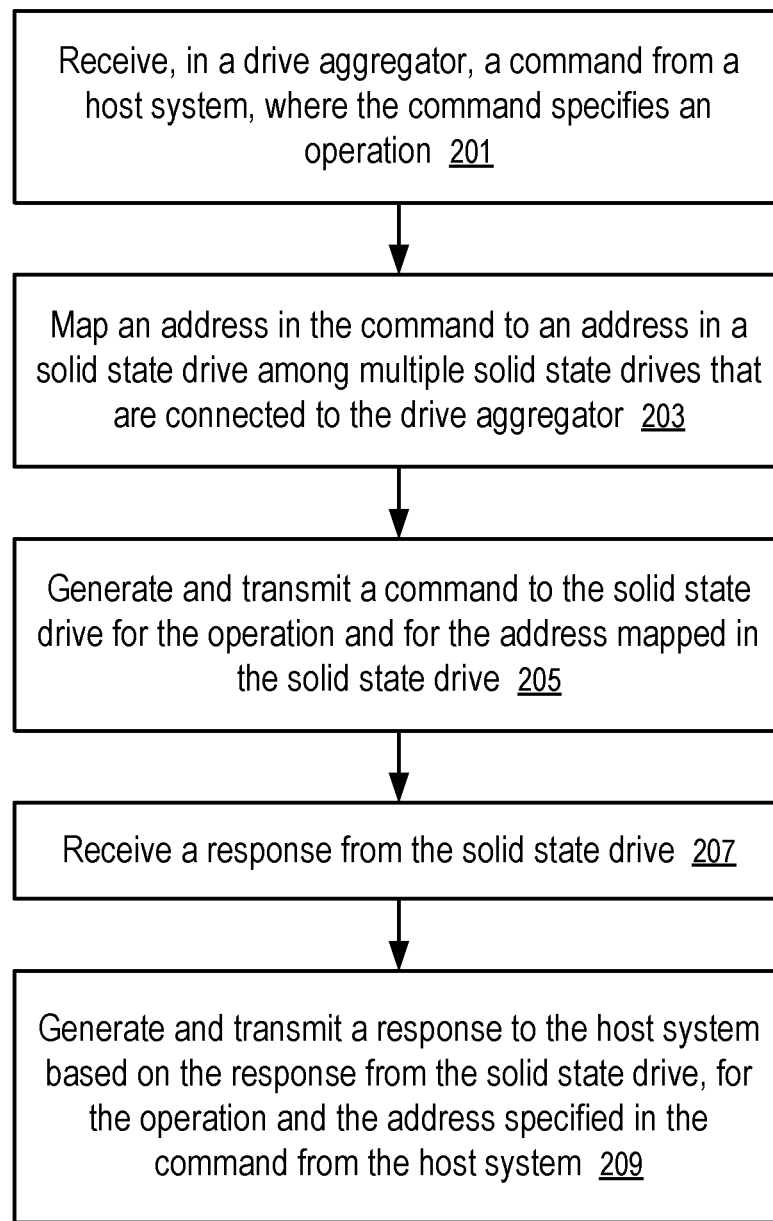
FIG. 4 shows a method implemented in a drive aggregator according to one embodiment.

FIG. 4 shows a method implemented in a drive aggregator 103 according to one embodiment. For example, the method of FIG. 4 can be implemented in the drive aggregator 103 illustrated in FIGS. 1, 2, and/or 3.

At block 201, a drive aggregator 103 receives a command from a host system 111. The command specifies an operation to be performed by a solid state drive 101. The drive aggregator 103 functions as the controller of a single solid state drive 101 to the host system 111. Thus, the commands from the host systems 111 to the drive aggregator are configured as being addressed to the same solid state drive 101. The drive aggregator 103 is connected to multiple solid state drives 107 to 109.

At block 203, the drive aggregator 103 maps an address in the command from the host system 111 to an address in a solid state drive (e.g., 107 or 109) among multiple solid state drives 107 to 109 that are connected to the drive aggregator 103. The mapping can be based on a namespace specified in the command from the host system 111, a predetermined address mapping scheme, and/or an address map 159.

At block 205, the drive aggregator 103 generates and transmits a command to the solid state drive (e.g., 107 or 109). The command to the solid state drive (e.g., 107 or 109) is configured for the operation specified in the command received from the host system 111 and for the address mapped in the solid state drive (e.g., 107 or 109).

For example, a logical address defined in a namespace created in the memory capacity of the single solid state drive 101 can be mapped to the same logical address defined in the namespace created in the memory capacity of a solid state drive (e.g., 107 or 109) that is assigned to implement the namespace.

For example, the space of logical addresses defined in the entire memory capacity of the single solid state drive 101 represented by the drive aggregator 103 can be divided into regions (e.g., according to a predefined scheme). Different regions can be mapped to the spaces of logical addresses defined in the memory capacities of the component solid state drives 107 to 109.

When the communication protocol between the host system 111 and the drive aggregator 103 is different from the communication protocol between the drive aggregator 103 and the component solid state drives 107 to 109, the drive aggregator 103 can perform the command translation according to the communication protocols.

When the communication protocol between the host system 111 and the drive aggregator 103 is same as the communication protocol between the drive aggregator 103 and the component solid state drives 107 to 109, the drive aggregator 103 can be configured to forward the command to the target solid state drive 101 without changes in some implementations (e.g., when the address mapping is based on namespace).

For example, the communication protocol between the host system 111 and the drive aggregator 103 and the communication protocol between the drive aggregator 103 and the component solid state drives 107 to 109, the drive aggregator 103 can each be any one of standard protocols, such as a protocol for a serial advanced technology attachment (SATA) interface, a protocol for a peripheral component interconnect express (PCIe) interface, a protocol for a universal serial bus (USB) interface, a protocol for a fibre channel, etc.

At block 207, the drive aggregator 103 receives a response from the solid state drive (e.g., 107 or 109) that is responsive to the command to the solid state drive (e.g., 107 or 109).

At block 209, the drive aggregator 103 generates and transmits a response to the host system 111 based on the response from the solid state drive (e.g., 107 or 109), where the response to the host system is responsive to the command from the host system for the operation and the address specified in the command from the host system.

In some implementations, the drive aggregator 103 performs protocol translation to account for the protocol differences between the connection 135 to the host system 111 and the connection (e.g., 137) to the component solid state drive (e.g., 109). In other implementations, the drive aggregator 103 performs further adjust for the response to the host system 111 to account for the logical address differences between the command from the host system 111 and the command to the component solid state drive (e.g., 109).

Figure 5:
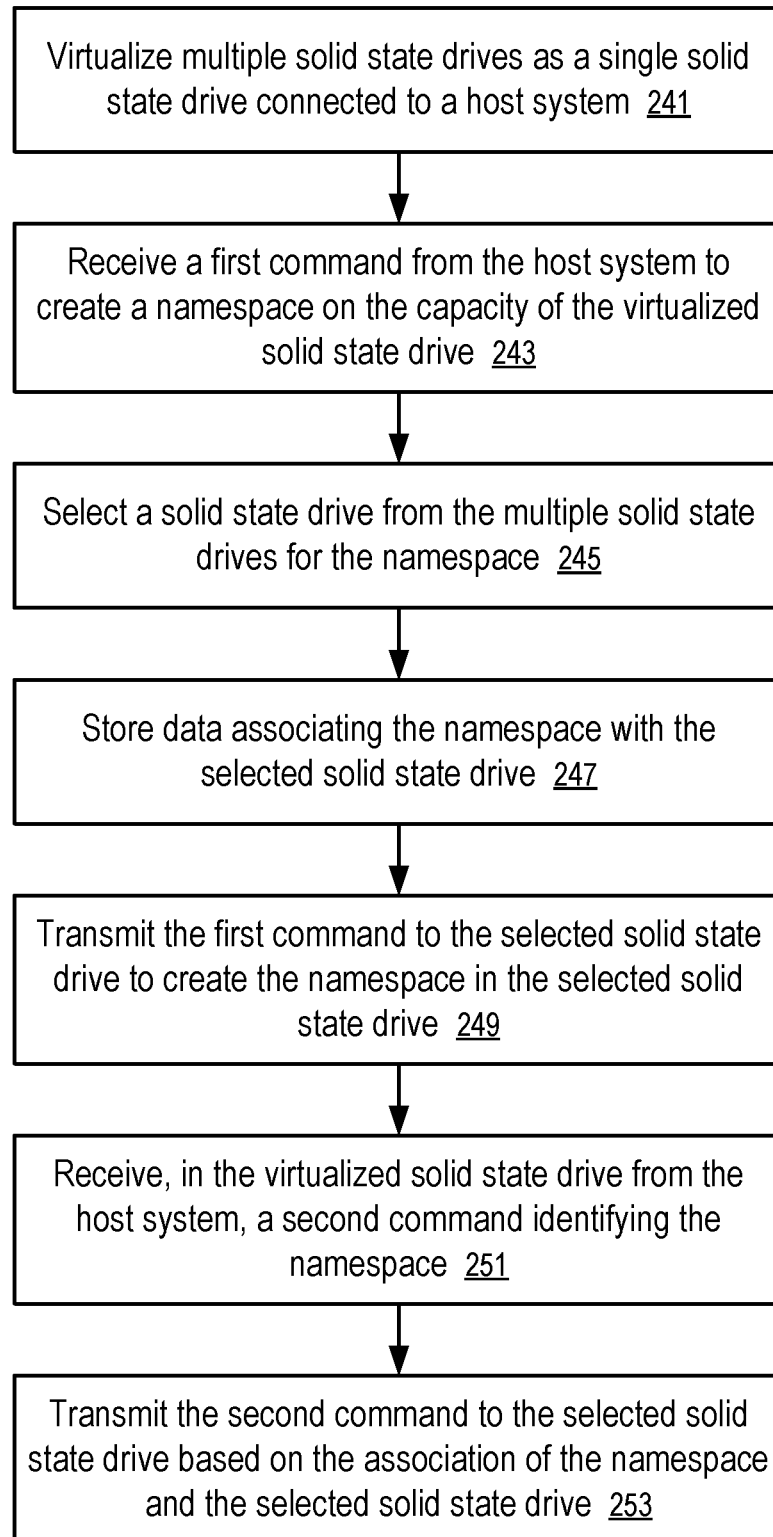
FIG. 5 shows a method of distributing commands received in a virtualized solid state drive to solid state drives.

FIG. 5 shows a method of distributing commands received in a virtualized solid state drive to solid state drives. For example, the method of FIG. 5 can be implemented in a virtualized solid state drive 101 of FIG. 1 having component solid state drives 107 to 109 in a configuration illustrated in FIG. 2. For example, the method of FIG. 5 can be implemented in the drive aggregator 103 illustrated in FIGS. 1, 2, and/or 3.

At block 241, a drive aggregator 103 virtualizes multiple solid state drives 107 to 109 as a single solid state drive 101 connected to a host system 111.

At block 243, the drive aggregator 103 receives a first command from the host system 111 to create a namespace on the capacity of the virtualized solid state drive 101.

At block 245, the drive aggregator 103 selects a solid state drive (e.g., 107 or 109) from the multiple solid state drives 107 to 109 for the namespace.

At block 247, the drive aggregator 103 stores data associating the namespace with the selected solid state drive (e.g., 107 or 109).

At block 249, the drive aggregator 103 transmits the first command to the selected solid state drive (e.g., 107 or 109) to create the namespace in the selected solid state drive (e.g., 107 or 109).

At block 251, the drive aggregator 103 receives from the host system 111 a second command identifying the namespace.

At block 253, the drive aggregator 103 transmits the second command to the selected solid state drive (e.g., 107 or 109) based on the association of the namespace and the selected solid state drive.

The technique of distributing commands to component solid state drives 107 to 109 as in FIG. 5 can simplify the translation logic 153 of the drive aggregator 103 and thus reduces the complexity, energy consumption, and cost of the translation logic 153.

In some embodiments disclosed herein, a single solid state drive is configured with multiple physical host interfaces that allow multiple host systems to access the memory/storage capacity of the solid state drive. In some implementations, a host system can use multiple parallel and/or redundant connections to the multiple physical host interfaces of the solid state drive for improved performance and/or reliability.

Figure 6:
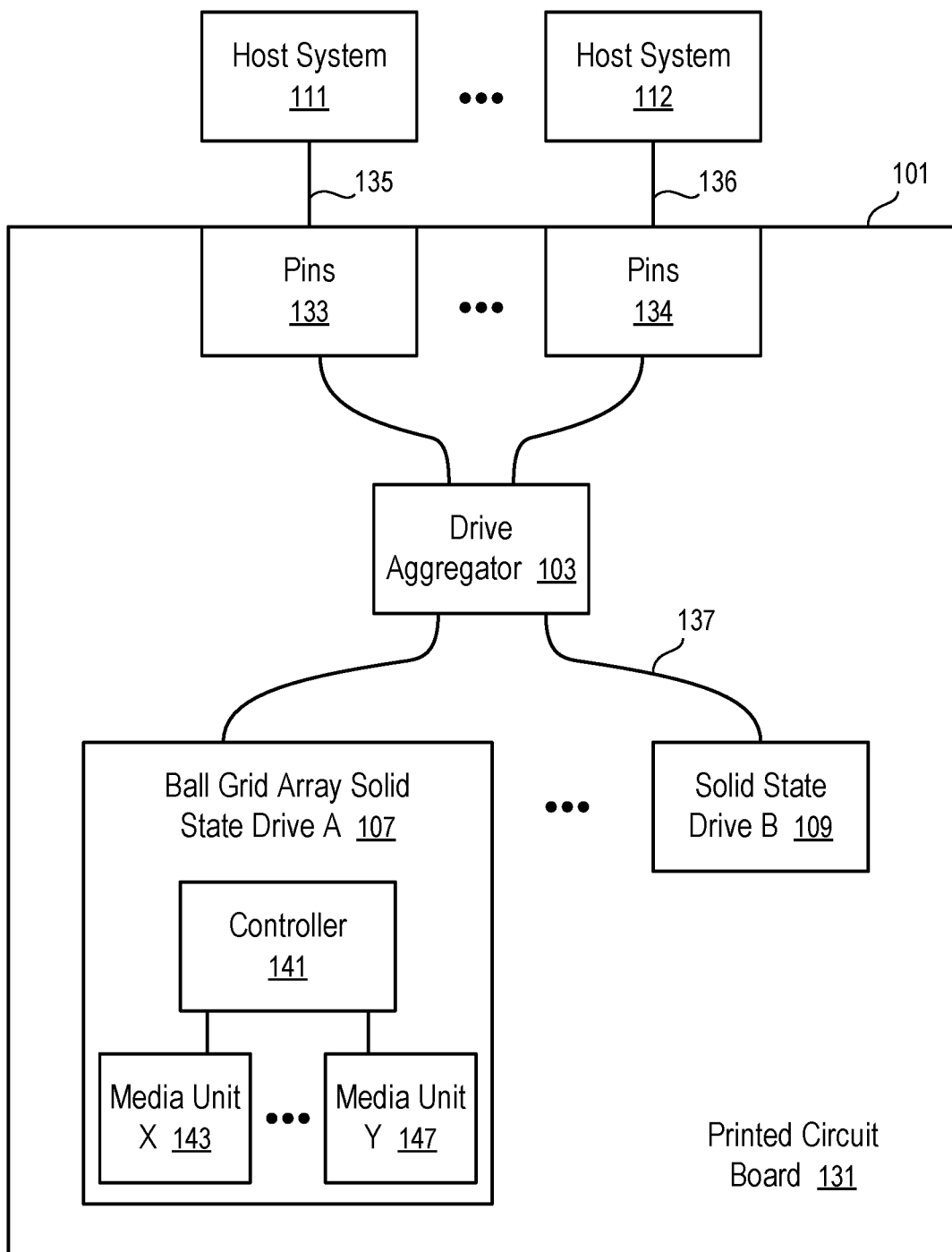
FIG. 6 shows multiple host systems connected to a virtualized single solid state drive having multiple component solid state drives.

FIG. 6 shows multiple host systems 111 to 112 connected to a virtualized single solid state drive 101 configured on a printed circuit board 131 with multiple component solid state drives 107 to 109.

Similar to the solid state drive 101 illustrated in FIG. 2, the solid state drive 101 illustrated in FIG. 6 can be constructed using multiple BGA SSDs (e.g., 107) as the component solid state drives 107 to 109. Each component solid state drive (e.g., 107) has a controller (e.g., 141) that is capable of servicing a host system (e.g., 111) directly without the drive aggregator 103, when the component solid state drive (e.g., 107) is connected directly to the host system (e.g., 111).

The drive aggregator 103 is configured to virtualize the memory/storage capacity of the set of component solid state drives 107 to 109 as the memory/storage capacity of a single virtualized solid state drive 101 and as a uniform memory/storage resource for the host systems 111 to 112.

The printer circuit board 131 is configured with multiple sets of pins 133 to 134. Each set of pins (e.g., 133 or 134) is sufficient to establish a connection between a host system (e.g., 111 or 112) and the solid state drive 101 for full access to the solid state drive 101. For example, a host system (e.g., 111 or 112) can transmit commands or requests to the solid state drive 101 using any pin set (e.g., 133 or 134) and receive responses to the respective commands or requests.

The multiple sets of pins 133 to 134 allow the host systems 111 to 112 in FIG. 6 to communicate with the solid state drive 101 using the parallel connections 135 to 136 respectively. For example, the host system 111 can send a command/request to the solid state drive 101 through the connection 135 and the pins 133, while concurrently the host system 112 can send a similar command/request (or a command/request of a different type) to the solid state drive 101 through another connection 136 and the alternative pins 134. For example, the host system 111 can send a write command at the same time as the host system 112 is sending a write command or a read command to the solid state drive 101. Thus, the host systems 111 to 112 can share the memory/storage resources offered by the solid state drive 101 as a whole.

The drive aggregator 103 of FIG. 6 can service the commands/requests from each host system (e.g., 111 or 112) in a way similar to the drive aggregator 103 illustrated in and described with FIGS. 2-5.

In some instances, when two concurrent commands are mapped to a same component solid state drive (e.g., 107 or 109) for execution, the drive aggregator 103 of FIG. 6 can further resolve the conflict by scheduling the commands for non-concurrent execution, as further discussed below.

Figure 7:
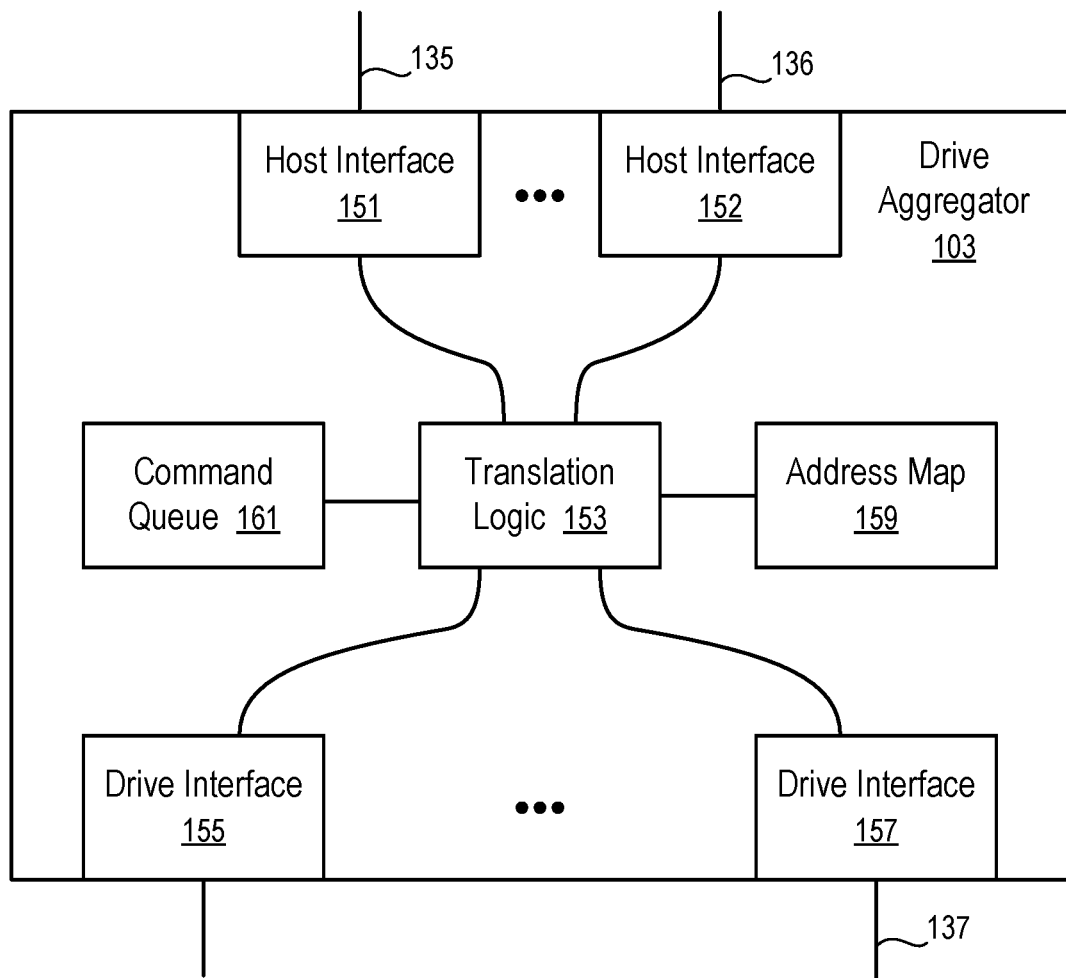
FIG. 7 shows a drive aggregator having multiple host interfaces according to one embodiment.

FIG. 7 shows a drive aggregator 103 having multiple host interfaces 151 to 152 according to one embodiment. For example, the drive aggregator 103 of FIG. 7 can be used in the solid state drive 101 of FIG. 8.

The translation logic 153 of FIG. 7 can distribute commands received in a host interface (e.g., 151 or 152) to the drive interfaces 155 to 157 based on an address map 159, in a way similar to the translation logic 153 of FIG. 3.

Further, when multiple commands are received concurrently in multiple host interfaces 151 to 152, the operations of the commands may be mapped to different drive interfaces in some situations and mapped to a same drive interface in other situations. For example, when the multiple commands are configured to operate on logical addresses associated with the same drive interface 155, a conflict occurs. The conflict prevents the translation logic 153 from executing the commands concurrently using the drive interfaces in parallel. In such a situation, the translation logic 153 can use a command queue 161 to schedule the sequential execution of the commands to avoid conflicts.

When there is no conflict, multiple commands received concurrently in multiple host interfaces 151 to 152 can be executed in parallel by separate component solid state drives (e.g., 107 to 109) that are connected to the drive interfaces 155 to 157 respectively. The execution can be performed via generating the respective commands for the component solid state drives (e.g., 107 to 109) in some implementations, or via forwarding the received commands to the respective drive interfaces 155 to 157.

When there is a conflict, the translation logic 153 can use the command queue 161 to schedule sequential execution of conflicting commands received from different host interfaces 151 to 152. For example, when two commands received in the host interfaces 151 and 152 identify a same namespace (or a logical address region) that is associated with the drive interface 155 according to the address map 159, the translation logic 153 can queue one of the commands in the command queue 161 and forward the other command to the drive interface 155 (or generate and transmit a corresponding command for the operation of the other command after proper protocol and/or address translation). Subsequently, the translation logic 153 can retrieve the remaining command from the command queue 161 and forward it to the drive interface (or generate and transmit a corresponding command for the operation of the command retrieved from the command queue after proper protocol and/or address translation).

In some implementations, the translation logic 153 supports executions of commands received from a host interface (e.g., 151 or 152) out of the order in which the commands are received from the host interface (e.g., 151 or 152). The translation logic 153 can arrange the execution orders of commands via the command queue to increase parallel transmissions of commands to the drive interfaces 155 to 157 and thus improve the overall performance of the solid state drive 101 having the drive aggregator 103.

In some instances, two or more of the host interfaces 151 to 152 can be used by a same host system for increased communication bandwidth to the drive aggregator and/or improved reliability in connection to the drive aggregator.

Figure 8:
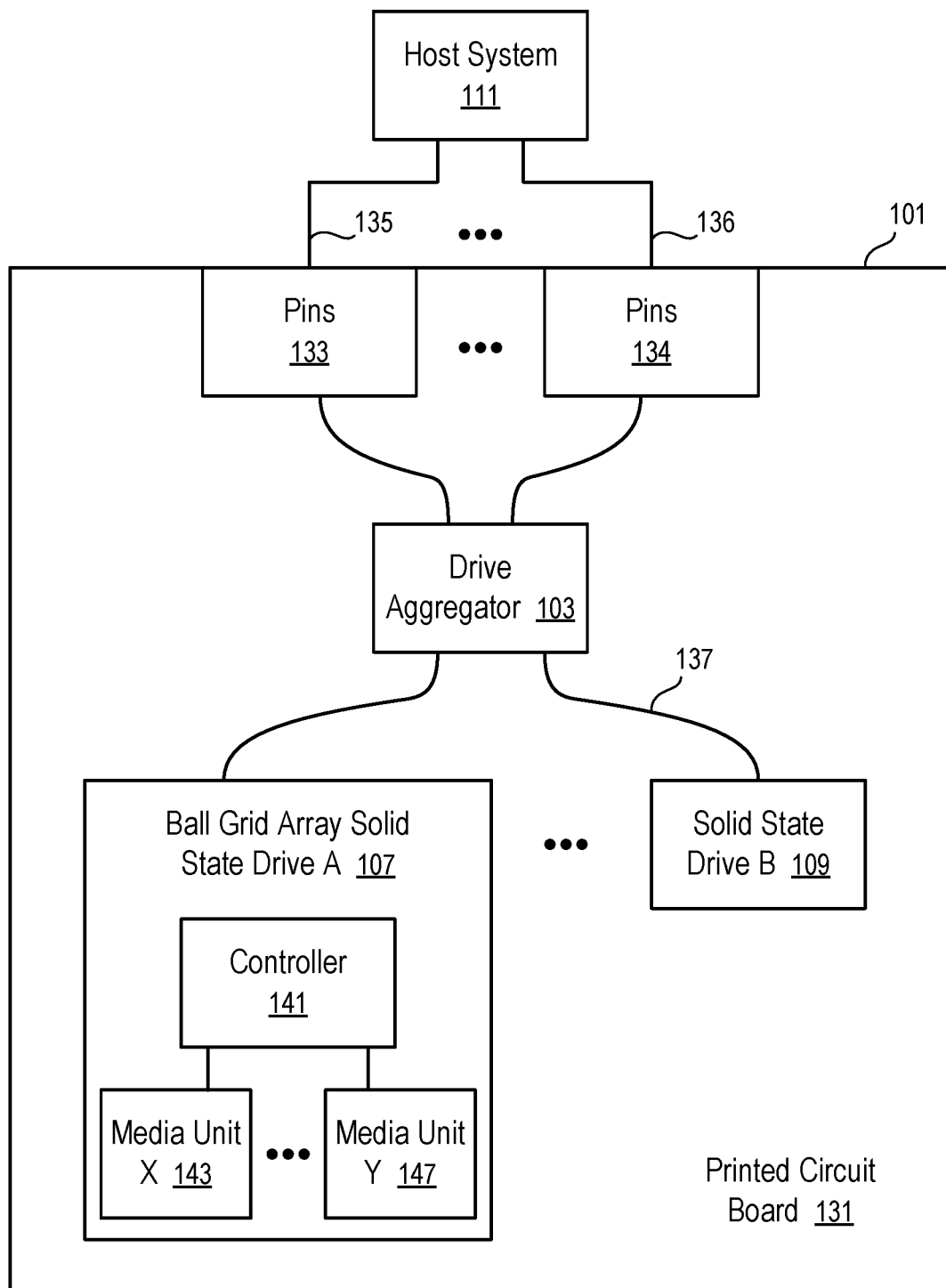
FIG. 8 shows a host system connected to a virtualized single solid state drive via multiple parallel and/or redundant connections.

FIG. 8 shows a host system 111 connected to a virtualized single solid state drive 101 via multiple parallel and/or redundant connects 135 to 136. For example, the virtualized single solid state drive 101 of FIG. 8 can be implemented in a way similar to the virtualized single solid state drive 101 of FIG. 6 using a drive aggregator 103 of FIG. 7.

In FIG. 8, the virtualized single solid state drive 101 has multiple sets of pins 133 to 134 that may be connected to separate host systems in a way as illustrated in FIG. 7. In the example of FIG. 8, the multiple sets of pins 133 to 134 of the solid state drive 101 are connected via parallel, redundant connections to a same host system 111. Thus, the host system 111 can use any of the connections to send a specific command to the solid state drive 101 (e.g., to write/store data in memory cells or read/retrieve data from memory cells).

For example, when one of the connections (e.g., 135 or 136) is damaged, the host system 111 can use the remaining connections (e.g., 136 or 135) to access the memory/storage capacity of the solid state drive 101. Thus, the reliability of the system is improved.

Further, the host system 111 can send multiple commands in parallel via the connections 135 to 136 to the solid state drive 101 for execution. For example, the host system 111 can send a read command via the connection 135 while sending a write command via the connection 136 concurrently. For example, the host system 111 can use the connection 135 for a read stream of data stored into a namespace that is configured on the component solid state drive 107, while concurrently using the connection 136 for a write stream of data retrieved from another namespace that is configured on another component solid state drive 109.

Figure 9:
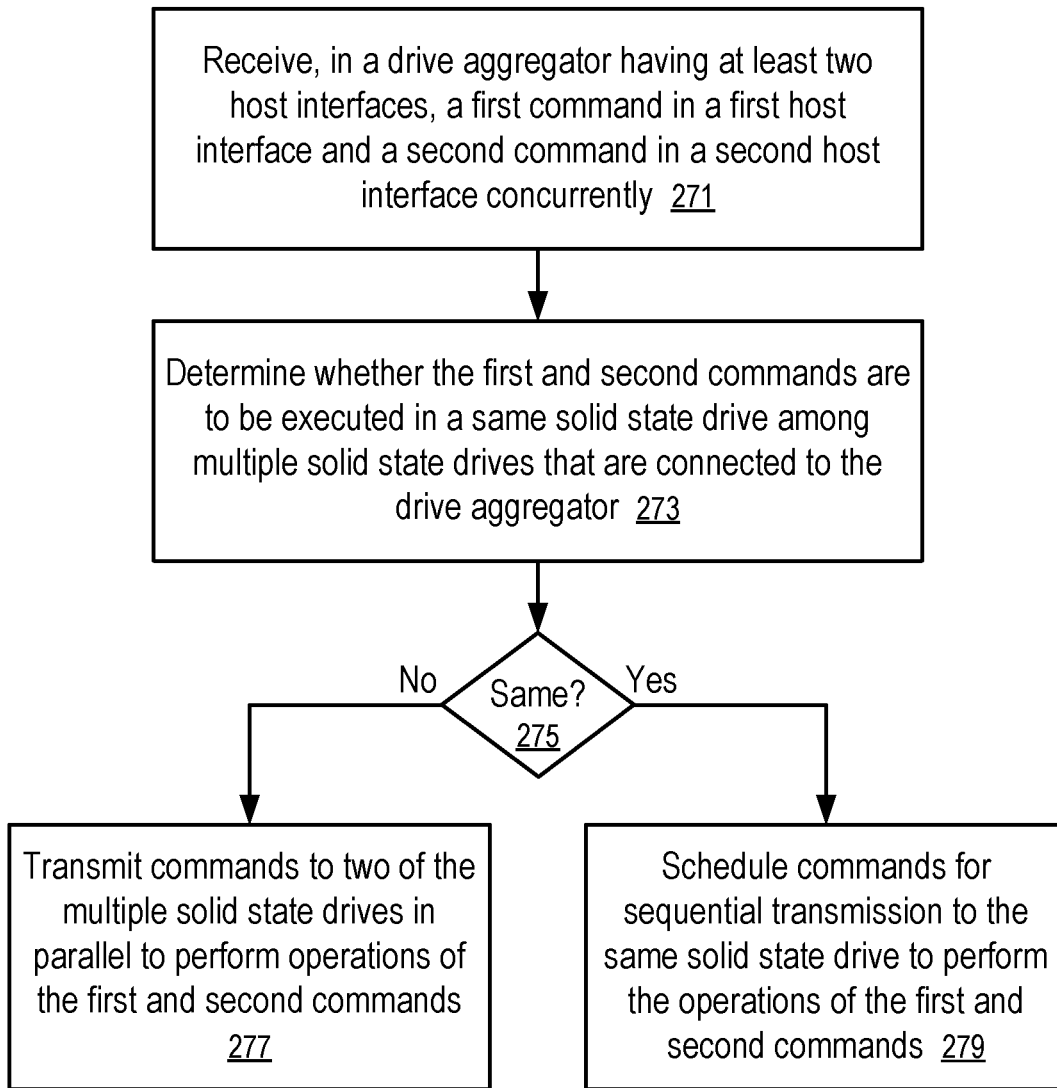
FIG. 9 shows a method of processing commands received in a virtualized solid state drive via multiple host interfaces.

FIG. 9 shows a method of processing commands received in a virtualized solid state drive 101 via multiple host interfaces 151 to 152. For example, the method of FIG. 9 can be implemented in a virtualized solid state drive 101 of FIG. 1 having component solid state drives 107 to 109 in a configuration illustrated in FIG. 6 or 8. For example, the method of FIG. 9 can be implemented in the drive aggregator 103 illustrated in FIGS. 6, 7, and/or 8. Further, the method of FIG. 9 can be used in combination with the method of FIGS. 4 and/or 5.

At block 271, a drive aggregator 103 having at least two host interfaces (e.g., 151 and 152) receives concurrently a first command in a first host interface (e.g., 151) and a second command in a second host interface (e.g., 152).

At block 273, the translation logic 153 of the drive aggregator 103 determines whether the first and second commands are to be executed in a same solid state drive (e.g., 107 or 109) among multiple solid state drives 107 to 109 that are connected to the drive aggregator 103 through the drive interfaces 155 to 157 of the drive aggregator 103.

At block 275, a determination that the first and second commands are to be executed in a same solid state drive (e.g., 107 or 109) leads to block 279; and a determination that the first and second commands are to be executed in different solid state drives (e.g., 107 and 109) leads to block 279.

For example, for each respective command in the first and second commands received in the host interfaces (e.g., 151 and 152), the translation logic 153 can determine the memory cells to be operated upon. For example, the memory cells can be operated upon for reading data or for writing data according to the logical addresses specified in respective commands. When the memory cells are determined to be in the component solid state drive (e.g., 107 or 109) connected to a drive interface (e.g., 155 or 157), the respective command is to be executed in the component solid state drive (e.g., 107 or 109). For example, the identification of the component solid state drive (e.g., 107 or 109) can be made using an address map 159, based on the logical address of the memory cells specified in the respective command and/or the namespace of the logical address (e.g., as discussed above in connection with FIGS. 4 and 5). When each command is mapped to a component solid state drive (e.g., 107 or 109), multiple concurrent commands may be mapped to a same component solid state drive (e.g., 107 or 109) in some instances, and not mapped to any same component solid state drive (e.g., 107 or 109) in other instances.

At block 277, the translation logic 153 transmits commands to two of the multiple solid state drives 107 to 109 in parallel to perform operations of the first and second commands, since the first and second commands do not operate on the same component solid state drive (e.g., 107 or 109).

At block 279, the translation logic 153 schedules commands for sequential transmission to the same solid state drive (e.g., 107 or 109) to perform the operations of the first and second commands, because the first and second commands operate on the same component solid state drive (e.g., 107 or 109). The sequential transmission resolves the conflict.

Similar to the operations in FIGS. 4 and 5, the commands transmitted to the solid state drive(s) in parallel or in sequence to perform operations of the first and second commands can involve protocol translation and address translations.

For example, when the communication protocol on the host connections 135 to 136 is different from the communication protocol on the drive connections (e.g., 137), the translation logic 153 translates from the protocol for the first and second commands to the commands to the drive interfaces 155 to 157.

For example, when the communication protocol on the host connections 135 to 136 is the same as the communication protocol on the drive connections (e.g., 137) and the address map 159 is based on the association between namespaces and the component drives on which the namespaces are hosted, the translation logic 153 can simply forward the first and second commands as the respective commands to the drive interfaces 155 to 157.

For example, when the address map 159 is used to map LBA address regions in commands received in the host interfaces 151 to 152 to different LBA addresses in the component solid state drives 157 to 159, the translation logic 153 can replace the LBA addresses in the commands received in the host interfaces 151 to 152 with mapped LBA addresses computed according to the address map 159 for the respective component solid state drives 157 to 159.

In some embodiments disclosed herein, a virtualized single solid state drive having multiple component solid state drives is configured to be addressable via multiple logical address spaces. For example, the multiple logical address spaces can be used in a way similar to multiple solid state drives each having a separate logical address space that is associated with the host interface of the corresponding solid state drive. However, when multiple solid state drives are used separately to provide the separate logical address spaces, the memory/storage resources identified using a logical address space is limited to be physically hosted within a specific solid state drive. In contrast, when multiple solid state drives are configured as component solid state drives of a virtualized single solid state drive having multiple logical address spaces, the memory/storage resources of each logical address space can be hosted among the component solid state drives for improved performance and/or capacity management. For example, the virtualized single solid state drive can have multiple host interfaces as illustrated in FIGS. 6-8. Each of the host interfaces can be configured to accept memory/storage access requests in a separate logical address space, as if the host interfaces were connected to separate solid state drives. The drive aggregator of the virtualized single solid state drive can use memory/storage resources in different component solid state drives for different portions of a logical address space associated with a host interface.

Figure 10:
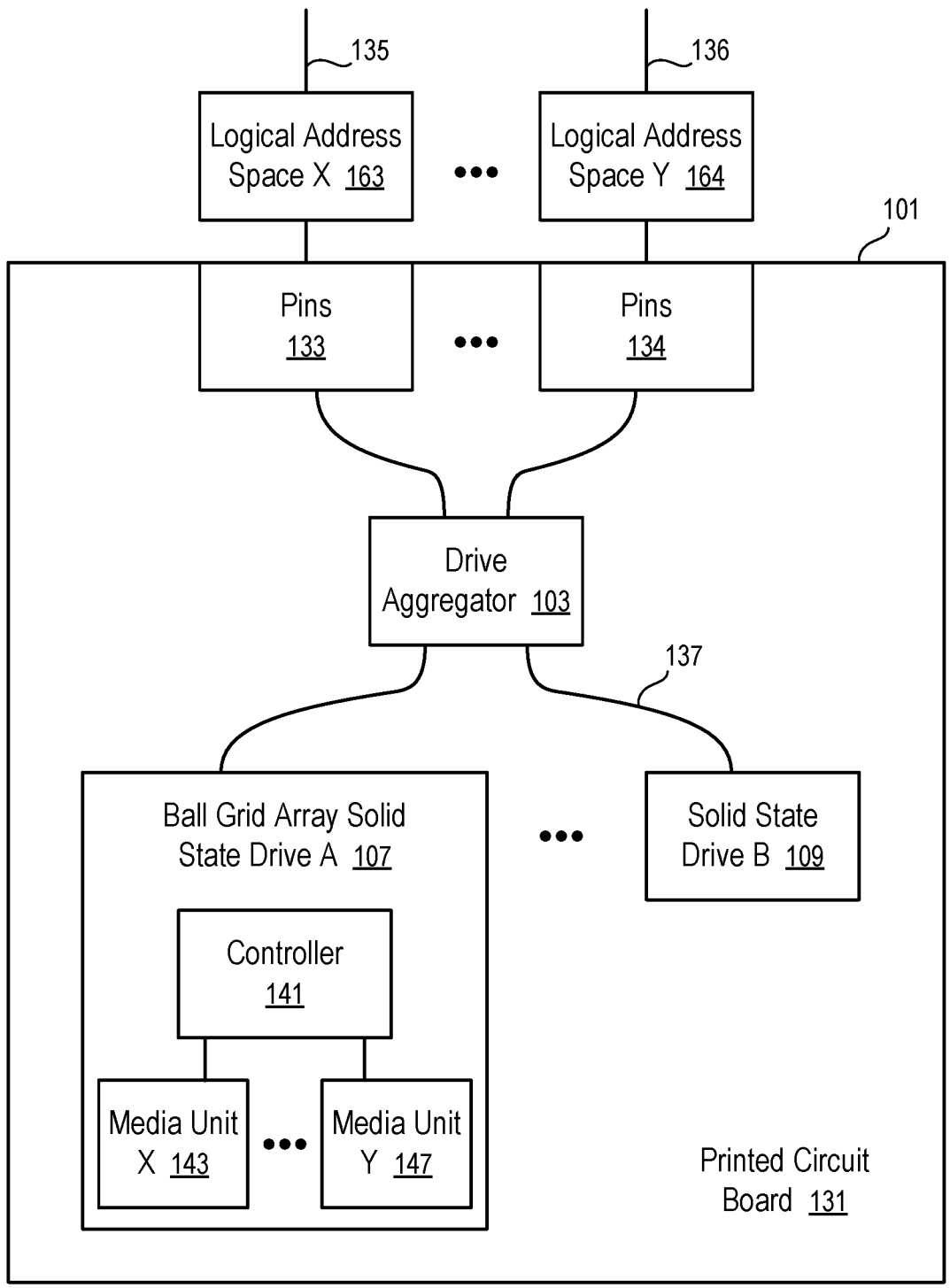
FIG. 10 illustrates a virtualized single solid state drive configured to be accessed via separate logical address spaces according to one embodiment.

FIG. 10 illustrates a virtualized single solid state drive 101 configured to be accessed via separate logical address spaces 163 to 164 according to one embodiment.

Similar to the virtualized single solid state drive 101 of FIG. 6 or 8, the virtualized single solid state drive 101 of FIG. 10 has multiple sets of pins 133 to 134. Each set (e.g., 133 or 134) of pins can be used to establish a connection (e.g., 135 or 136) to a host system (e.g., 111 or 112).

In FIG. 10, separate logical address spaces 163 to 164 are associated with the multiple sets of pins 133 to 134 respectively. For example, a same command having a same logical address can be received in the virtualized single solid state drive 101 using separate sets of pins (e.g., 133 and 134) respectively. The identification of the logical address can optionally include the use of a namespace. Since the separate sets of pins (e.g., 133 and 134) are associated with different logical address spaces (e.g., 163 and 164), the same logical address in the same commands can be considered to address different memory units in the virtualized single solid state drive 101 of FIG. 10. The drive aggregator 103 can optionally map these different memory units to a same component solid state drive (e.g., 107 or 109), or separate component solid state drives (e.g., 107 and 109). Each of the logical address spaces 163 to 164 is not limited to be physically hosted in a specific one of the component solid state drives 107 to 109. Each of the logical address spaces 163 to 164 can be physically hosted in more than one of the component solid state drives 107 to 109. Since the logical address spaces 163 to 164 are separate from each other, the memory/resources accessed via one set of pins (e.g., 133) are not accessible via another set of pins (e.g., 134). The drive aggregator 103 can dynamically distribute the memory/storage resources of the logical address spaces 163 to 164 based on the workloads and/or usage patterns of the logical address spaces 163 to 164.

In some implementations, some or all of the different sets of pins 133 to 134 can be configured to be associated with a same logical address space. For example, when the sets of pins 133 to 134 are connected to a same host system 111 via parallel connections 135 to 136, in a way illustrated in FIG. 8, the sets of pins 133 to 134 can be configured to share a same logical address space. Thus, the host system 111 can access data stored in a memory unit in one of the component solid state drives 107 to 109 using any of the connections 135 to 136 to the pins 133 to 134. Optionally, the host system 111 can configure some of the sets of pins 133 to 134 to share a same logical address space, but not other set(s) of pins.

Similarly, when the sets of pins 133 to 134 are connected to separate hosts 111 to 112, in a way illustrated in FIG. 6, some or all of the different sets of pins 133 to 134 can be configured to be associated with a same logical address space. Thus, some or all of the host systems 111 to 112 can share the same logical address space and a set of memory units associated with the logical address space.

For example, during an initialization process, the host system(s) (e.g., 111 to 112) can send commands to the sets of pins 133 to 134 to indicate the sharing status of the logical address spaces associated with the sets of pins 133 to 134. The drive aggregator 103 is configured to implement the sharing via mapping addresses of shared logical address spaces to the same set of memory resources in the component solid state drives 107 to 109 and mapping addresses of non-shared logical address spaces to the separate sets of memory resources in the component solid state drives 107 to 109.

Further, in some implementations, the host system(s) (e.g., 111 to 112) can send commands to request partial sharing of the logical address spaces 163 to 164. For example, a logical address region (e.g., represented by a namespace) in the logical address space 163 can be configured as being shared with the corresponding logical address region (e.g., represented by a corresponding namespace) in the logical address space 164. Thus, any of the separate connections 135 and 136 can be used to access the same data stored in the same set of memory units allocated to the share logical address region between the logical address spaces 163 and 164. For example, data stored via the connection 135 in the shared logical address region can be accessed via the alternative connection 136.

However, some logical address regions can be not shared between logical address spaces 163 and 164. Thus, the data stored in the non-shared logical address regions can be limited to be accessed via the respective connections 135 and 136 for the respective logical address spaces 163 and 164. For example, data stored via the connection 135 in a non-shared logical address region is prohibited to be access via the connection 136.

Figure 11:
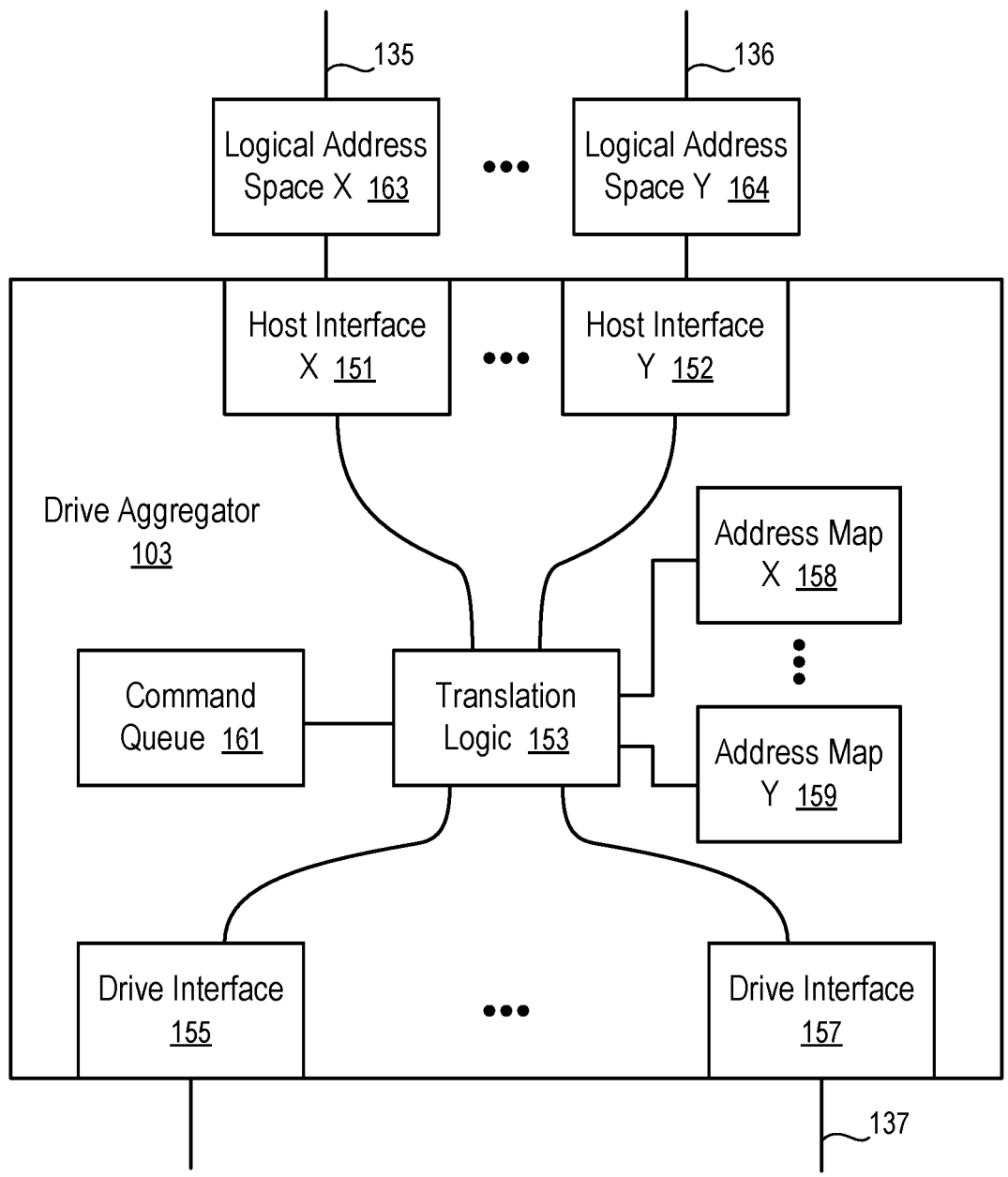
FIG. 11 illustrates a drive aggregator configured to facilitate access to memory/storage resources in a virtualized single solid state drive using separate logical address spaces.

FIG. 11 illustrates a drive aggregator 103 configured to facilitate access to memory/storage resources in a virtualized single solid state drive using separate logical address spaces. For example, the drive aggregator 103 of FIG. 11 can be used in the solid state drive 101 of FIG. 10.

Like the drive aggregator 103 of FIG. 7, the drive aggregator 103 of FIG. 11 has multiple host interfaces 151 to 152 for separate connections 135 to 136 to one or more host systems (e.g., 111 to 112).

In general, the host interfaces 151 to 152 of the drive aggregator 103 of FIG. 103 of FIG. 11 are associated with separate logical address spaces 163 to 164 respectively. The address maps 158 to 159 are configured for the logical address spaces 163 to 164 respectively.

When the logical address spaces 163 to 164 have no shared regions, the address maps 158 to 159 have no overlapping portions. For example, the address map 158 maps the logical addresses in the space 163 to a set of memory units connected to the drive interfaces 155 to 157; the address map 158 maps the logical addresses in the space 164 to another set of memory units connected to the drive interfaces 155 to 157; and different sets of memory units identified in the address maps 158 and 159 have no common memory units.

When some of the logical address spaces 163 to 164 are partially shared (e.g., in response to configuration commands received from the host system(s)), the address maps 158 to 159 have overlapping portions. For example, the address map 158 maps a portion of logical addresses in the space 163 to a set of memory units connected to the drive interfaces 155 to 157; the address map 158 maps a portion of the logical addresses in the space 164 to another set of memory units connected to the drive interfaces 155 to 157. When the portion of the logical addresses in the space 163 and the portion of the logical addresses in the space 164 are configured to be shared across the logical address spaces 163 and 164, the address map 158 maps the portion of logical addresses in the space 163 to the same set of memory units that is mapped to by the address map 159 for the portion of the logical addresses in the space 164. However, when the portion of the logical addresses in the space 163 and the portion of the logical addresses in the space 164 are configured to be not shared across the logical address spaces 163 and 164, the set of memory units to which the portion of logical addresses in the space 163 is mapped by the address map 158 do not share any memory unit in the set of memory units to which the portion of the logical addresses in the space 164 is mapped by the address map 159.

Similarly, the drive aggregator 103 can configured the address maps 158 to 159 to allow some or all of the host interfaces 151 to 152 to share a same logical address space. The sharing can be implemented by the address maps 158 to 159 of the corresponding host interfaces by mapping to the same set of memory units connected to the drive interfaces 155 to 157. In some instances, the sharing can be implemented via sharing an address map for some or all of the host interfaces 151 to 152.

Figure 12:
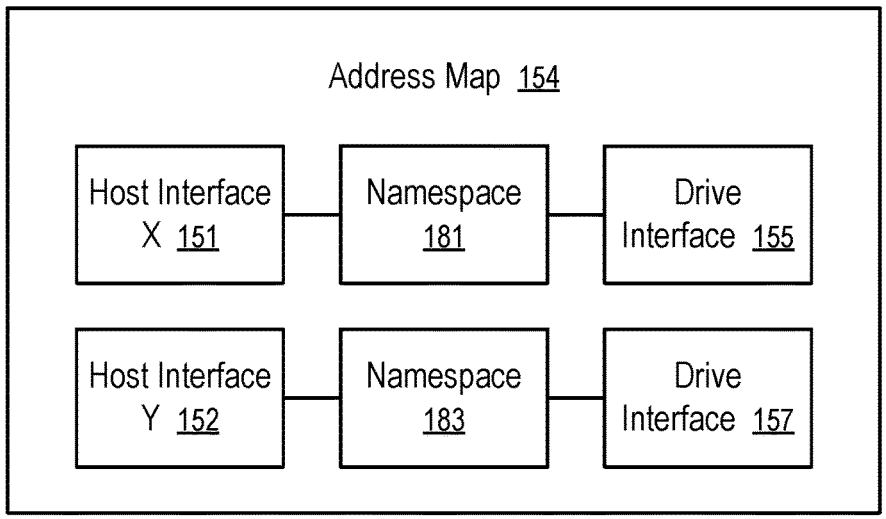
FIGS. 12-14 illustrate examples of address maps.
Figure 13:
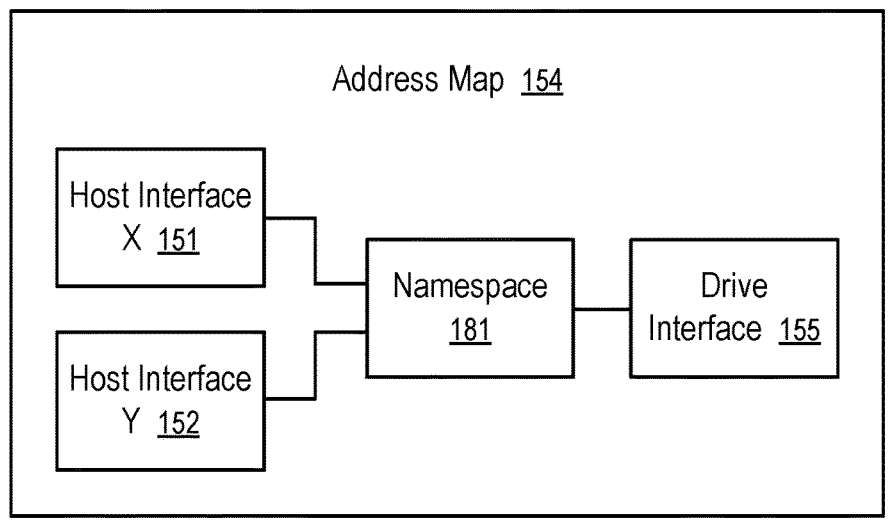
Figure 14:
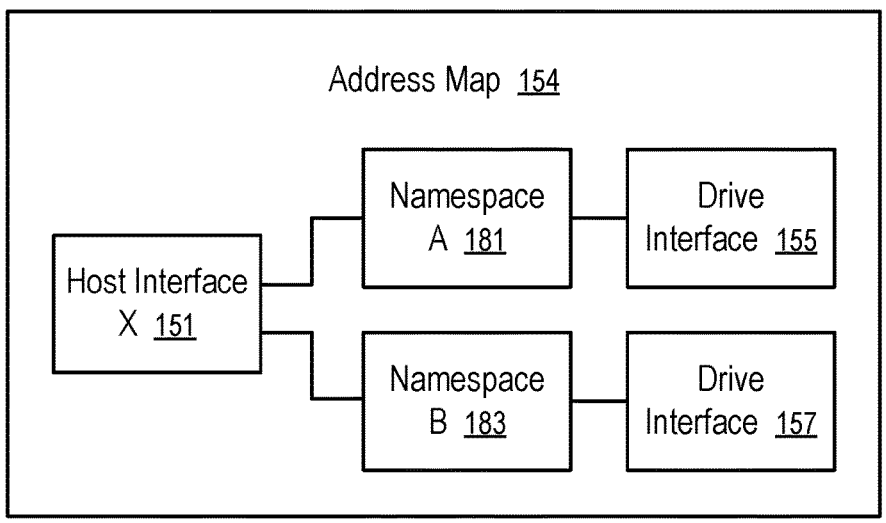

FIGS. 12-14 illustrate examples of address maps. For example, the address maps 154 illustrated in FIGS. 12-14 can be used in the drive aggregator 103 of FIG. 11.

In FIG. 12, namespaces 181 and 182 created via commands received via separate host interfaces 151 and 152 are considered as different namespaces. When the namespaces 181 and 182 have the same identification in the commands received via the separate host interfaces 151 and 152, the namespaces 181 and 182 of the host interfaces 151 and 152 are mapped to different drive interfaces 155 and 157. Thus, commands addressing using the same namespace identification but different host interfaces are hosted in different component solid state drives (e.g., 107 and 109); and the data stored using the namespace identification in commands transmitted via one host interface (e.g., 151) cannot be accessed via commands transmitted via another host interface (e.g., 152).

Optionally, the same identification of namespaces 181 and 183 of the host interfaces 151 and 152 can be mapped to different namespace identifications using the address map 154. The different namespace identifications can be used to create corresponding namespaces in a same component solid state drive (e.g., 107) connected to a same drive interface (e.g., 155) or in different component solid state drive (e.g., 107 and 109) connected to different drive interface (e.g., 155 and 157).

FIG. 13 illustrates a configuration where a namespace 181 is shared between two host interfaces 151 and 152. The namespace 181 mapped to a drive interface 155.

Based on the address map 154 of FIG. 13, commands identifying the namespace and received either in the host interface 151 or in the host interface 152 can be forward to the drive interface 155 to access the same set of memory units. For example, a host connection 135 can be used to store data into the namespace 181 hosted in the component solid state drive (e.g., 107) connected to the drive interface 155; and another host connection 136 can be used to retrieve the data from the namespace 181 hosted in the same component solid state drive (e.g., 107) connected to the same drive interface 155.

In general, multiple namespaces can be mapped to a drive interface 155. Some of the namespaces mapped to the drive interface 155 can be shared across multiple host interfaces (e.g., 151 and 152), while other namespaces mapped to the drive interface 155 can be not shared among host interfaces.

FIG. 14 illustrates a configuration where the namespaces 181 and 183 created via a host interface 151 are hosted on different component solid state drives (e.g., 107 and 109) connected to different drive interfaces 155 and 157.

In general, some of the namespaces 181 and 183 created via the host interface 151 may be shared across multiple host interfaces; and some of the namespaces 181 and 183 created via the host interface 151 may be not shared with any other host interfaces. Thus, various combinations of FIGS. 12-14 and alternatives can be implemented.

Figure 15:
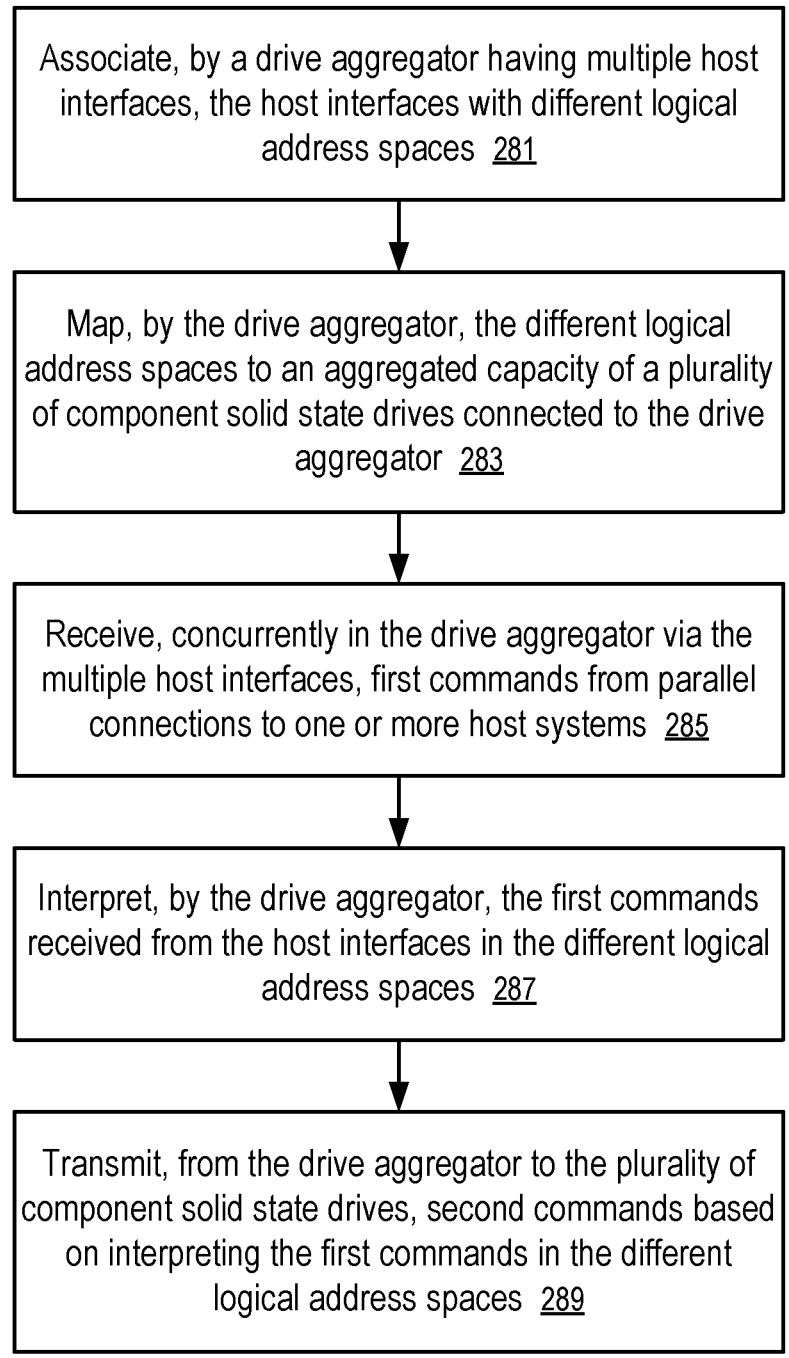
FIG. 15 shows a method of accessing memory/storage resources in a virtualized single solid state drive using separate logical address spaces.

FIG. 15 shows a method of accessing memory/storage resources in a virtualized single solid state drive using separate logical address spaces. For example, the method of FIG. 15 can be implemented in a virtualized solid state drive 101 of FIG. 1 having component solid state drives 107 to 109 in a configuration illustrated in FIG. 2, 6, 8, or 10. For example, the method of FIG. 15 can be implemented in the drive aggregator 103 illustrated in FIGS. 6-8, 10, and/or 11 with address maps illustrated in FIGS. 11, 12, 13, and/or 14. Further, the method of FIG. 15 can be used in combination with the method of FIGS. 4, 5, and/or 9.

At block 281, a drive aggregator 103 is configured to associate its multiple host interfaces 151 to 152 with different logical address spaces 163 to 164.

At block 283, the drive aggregator 103 maps the different logical address spaces 163 to 164 to an aggregated capacity of a plurality of component solid state drives 107 to 109 that are connected to the drive aggregator 103 in a virtualized signal solid state drive 101.

At block 285, the drive aggregator 103 receives concurrently via the multiple host interfaces 151 to 152 first commands from parallel connections 135 to 136 to one or more host systems (e.g., 111 and/or 112).

At block 287, the drive aggregator 103 interprets the first commands received from the host interfaces 151 to 152 in the different logical address spaces 163 to 164.

For example, the drive aggregator 103 can be configured with separate address maps 158 to 159 associated with the multiple host interfaces 151 to 152 respectively to translate from logical addresses identified in the commands received from the host interfaces 151 to 152 to logical addresses in commands transmitted from the drive aggregator 103 to the plurality of component solid state drives 107 to 109.

At block 289, the drive aggregator 103 transmits, to the plurality of component solid state drives 107 to 109, second commands based on interpreting the first commands in the different logical address spaces 163 to 164.

For example, the multiple host interfaces 151 to 152 can include a first host interface 151 and a second host interface 152, where the first host interface 151 and the second host interface 152 are associated with a same logical address space that is separate and different from at least one other logical address space associated with a third interface in the multiple host interfaces 151 to 152. Thus, data stored via commands transmitted via the first is not addressable via commands transmitted via the third interface but addressable via commands transmitted via the second interface.

For example, the multiple host interfaces 151 to 152 can include a first host interface 151 associated with a first logical address space and a second host interface 152 associated with a second logical address space; an address map 158 maps the first logical address space to a first portion of the aggregated capacity of the plurality of component solid state drives 107 to 109; and an address map 159 maps the second logical address space to a second portion of the aggregated capacity of the plurality of component solid state drives 107 to 109. The first portion of the aggregated capacity and the second portion of the aggregated capacity partially can be completely separate from each other, or be configured to partially overlap with each other.

When the first portion of the aggregated capacity and the second portion of the aggregated capacity partially are configured to partially overlap with each other, a first portion of data stored via commands transmitted via the first host interface 151 is not addressable via commands transmitted via the second host interface 152; and a second portion of data stored via commands transmitted via the first host interface 151 is addressable via commands transmitted via the second host interface 152.

For example, a namespace 181 associated with the first host interface 151 and a namespace 183 associated with the second host interface 152 can be mapped to separate, non-overlapping portions of the aggregated capacity of the component solid state drives 107 to 109, or mapped to an overlapping part of the first portion of the aggregated capacity and the second portion of the aggregated capacity.

The methods discussed above (e.g., in connection with FIGS. 4, 5, 9 and/or 15) can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods of FIGS. 4, 5, 9 and/or 15 are performed at least in part by the drive aggregator 103 of FIG. 1, 2, 3, 6, 7, 8, 10, or 11. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

In some implementations, a communication channel between the host system 111 and a memory sub-system (e.g., the solid state drive 101) includes a computer network, such as a local area network, a wireless local area network, a wireless personal area network, a cellular communications network, a broadband high-speed always-connected wireless communication connection (e.g., a current or future generation of mobile network link); and the host system 111 and the memory sub-system can be configured to communicate with each other using data storage management and usage commands similar to those in NVMe protocol.

Some embodiments involving the operations of the drive aggregator 103 can be implemented using computer instructions executed by one or more microprocessors. The computer instructions can be configured as the firmware of the solid state drive 101. In some instances, hardware circuits can be used to implement at least some of the functions. The firmware can be initially stored in the non-volatile storage media, or another non-volatile device, and loaded into the volatile DRAM and/or the in-processor cache memory for execution by the microprocessors of the drive aggregator.

A non-transitory computer storage medium can be used to store instructions of the firmware of a memory sub-system (e.g., the solid state drive 101, or any of the component solid state drives 107 to 109). When the instructions are executed by the microprocessors, the instructions cause the memory sub-system to perform a method discussed above.

In general, an example machine of a computer system can have a set of instructions, for causing the machine to perform any one or more of the methods discussed herein. In some embodiments, such a computer system can correspond to a host system (e.g., the host system 111 of FIG. 1) that includes, is coupled to, or utilizes a memory sub-system (e.g., the solid state drive 101 of FIG. 1) or can be used to perform the operations of a drive aggregator 103 (e.g., to execute instructions to perform operations corresponding to the drive aggregator 103 described with reference to FIGS. 1-15). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example machine can include a processing device, a main memory (e.g., read-only memory (ROM), flash memory, dynamic random access memory (DRAM) such as synchronous DRAM (SDRAM) or Rambus DRAM (RDRAM), static random access memory (SRAM), etc.), and a data storage system, which communicate with each other via a bus (which can include multiple buses).

A processing device discussed herein can include one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. A processing device discussed herein can also be one or more special-purpose processing devices such as an application specific integrated circuit (ASIC), a field programmable gate array (FPGA), a digital signal processor (DSP), network processor, or the like. A processing device generally is configured to execute instructions for performing the operations and steps discussed herein. The example machine can further include a network interface device to communicate over a computer network.

The data storage system disclosed herein can include a machine-readable storage medium (also known as a computer-readable medium) on which is stored one or more sets of instructions or software embodying any one or more of the methodologies or functions described herein. The instructions can also reside, completely or at least partially, within the main memory and/or within the processing device during execution thereof by the computer system, the main memory and the processing device also constituting machine-readable storage media. The machine-readable storage medium, data storage system, and/or main memory can correspond to the memory sub-system.

In one embodiment, the instructions stored in the example machine include instructions to implement functionality corresponding to a drive aggregator 103 (e.g., as described with reference to FIGS. 1-15). While the machine-readable storage medium may be discussed in an embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A solid state drive, comprising:
   a drive aggregator having multiple host interfaces; and
   a plurality of component solid state drives connected to the drive aggregator, each of the component solid state drives having a controller capable of processing commands from host systems;
   wherein the drive aggregator is configured to associate the host interfaces with different logical address spaces, interpret commands received from the host interfaces in the different logical address spaces, and implement the commands using the plurality of component solid state drives;
   wherein the drive aggregator is configured with separate address maps associated with the multiple host interfaces respectively to translate from the logical addresses identified in the commands received from the host interface to logical addresses in commands transmitted from the drive aggregator to the plurality of component solid state drives.

2. The solid state drive of claim 1, wherein data stored via commands transmitted via a first interface among the multiple host interfaces is not addressable via commands transmitted via a second interface among the multiple host interfaces.

3. The solid state drive of claim 1, wherein data stored via commands transmitted via a first interface among the multiple host interfaces is not addressable via commands transmitted via a second interface among the multiple host interfaces but is addressable via commands transmitted via a third interface among the multiple host interfaces.

4. The solid state drive of claim 1, wherein a first portion of data stored via commands transmitted via a first interface among the multiple host interfaces is not addressable via commands transmitted via a second interface among the multiple host interfaces; and a second portion of data stored via commands transmitted via the first interface is addressable via commands transmitted via the second interface.

5. The solid state drive of claim 1, further comprising:
a printed circuit board having multiple sets of pins, each set of pins is configured for a connection to a host system over a computer bus;
wherein the drive aggregator and the plurality of component solid state drives are mounted on the printed circuit board.

6. The solid state drive of claim 5, wherein each of the component solid state drives is integrated within an integrated circuit package having a ball grid array (BGA) form factor.

7. The solid state drive of claim 6, wherein the drive aggregator further comprises:
a plurality of drive interfaces configured to communicate with the plurality of component solid state drives respectively; and
a translation logic coupled between the host interfaces and the plurality of drive interfaces to generate commands to the component solid state drives based on the address maps.

8. The solid state drive of claim 7, wherein the host interfaces are configured according to a first protocol of communications between host systems and solid state drives; the plurality of drive interfaces are configured in accordance with a second protocol of communications between host systems and solid state drives; and each of the first protocol and the second protocol of communications are one of:
a protocol for a serial advanced technology attachment (SATA) interface;
a protocol for a peripheral component interconnect express (PCIe) interface;
a protocol for a universal serial bus (USB) interface; and
a protocol for a fibre channel.

\* \* \* \* \*